(12) United States Patent
Nobumoto

(10) Patent No.: US 7,216,130 B2
(45) Date of Patent: May 8, 2007

(54) EQUIPMENT AND PROCESS FOR MUSIC DIGITALIZATION, STORAGE, ACCESS AND LISTENING

(75) Inventor: Fernando Hissashi Nobumoto, São Paulo (BR)

(73) Assignee: Itautec S.A., Sao Paulo (BR)

( * ) Notice: Subject to any disclaimer, the term of this patent is extended or adjusted under 35 U.S.C. 154(b) by 444 days.

(21) Appl. No.: 10/661,306

(22) Filed: Sep. 12, 2003

(65) Prior Publication Data

US 2005/0060347 A1    Mar. 17, 2005

(51) Int. Cl.
*G06F 17/00* (2006.01)

(52) U.S. Cl. ............... 707/104.1; 707/102; 707/103 R; 707/101

(58) Field of Classification Search ............... None
See application file for complete search history.

(56) References Cited

U.S. PATENT DOCUMENTS

| | | | | |
|---|---|---|---|---|
| 5,691,494 A | * | 11/1997 | Sai et al. ............... | 84/609 |
| 5,728,960 A | * | 3/1998 | Sitrick ............... | 844/477 R |
| 5,819,049 A | * | 10/1998 | Rietmann ............... | 709/239 |
| 5,824,934 A | * | 10/1998 | Tsurumi et al. ............... | 84/609 |
| 5,899,699 A | * | 5/1999 | Kamiya ............... | 434/307 A |
| 6,437,229 B1 | * | 8/2002 | Nobumoto ............... | 84/615 |

* cited by examiner

*Primary Examiner*—Sana Al-Hashemi
(74) *Attorney, Agent, or Firm*—Wolf, Block, Schorr & Solis-Cohen LLP; William H. Dippert

(57) ABSTRACT

The invention relates to equipment and process for music digitalization, storage, access and listening, which equipment includes a digital music server (1), a music digitizing station (2), and a variable and convenient number of listening stations (3), the latter being interlinked to the server (1) and to the station (1) by the local network (4), it being also provided a central (or remote) digital music server (1A), said local (1) and central (or remote) (1A) digital music servers being a microcomputer with a large hard disk capacity for storing the digitized songs, and to centralize, in a database, all the information in the digitized CDs; said improvements also to allow the inclusion of more than one digital music server (1) and more than one digitizing station (2), and to allow only one microcomputer to be the digital music server (1) and the digitizing station (2), at the same time.

36 Claims, 8 Drawing Sheets

"P.F." = "next track"
"F.A." = "former track"
"Vol+" = "volume+"
"Vol-" = "volume -"

EQUIPMENT AND PROCESS FOR MUSIC DIGITALIZATION, STORAGE, ACCESS AND LISTENING

BACKGROUND OF THE INVENTION

The applicant is the assignee of the U.S. Pat. No. 6,437,229, filed on Nov. 17, 2000 and issued on Aug. 20, 2002, and it relates to an EQUIPMENT AND PROCESS FOR MUSIC DIGITALIZATION, STORAGE, ACCESS, AND LISTENING, which equipment and process are to be employed in any commercial establishments trading CDs, in order to enable users to listen to all the music tracks from all the CDs available at the store.

Said equipment and process are based on the digitizing of the music tracks and their storage in a hard disk for later access and hearing.

As a rule, they provide for one or more digital music servers (microcomputers where the music tracks from digitized CDs shall be stored), one or more music digitizing stations (microcomputers in charge of digitizing one passage of each music track from each CD), and a number of listening stations (microcomputers through which the music tracks stored in said servers may be accessed and listened by users). Each listening station, provided with an earphone, a keyboard with display, and a bar code reader, communicates via local network with said servers. Each music CD is provided with a bar code tag that identifies it on an individual basis, in an unmistakable way.

The listening stations described in the abovementioned patent are relatively costly due to the fact that each one comprises a personal computer (PC). Moreover, the apparatus described in this patent consists of a local system, in which the updating of the digital music server can only be made by means of the local digitizing station.

Patent document WO0209112 "Music listening system" describes a system comprising music listening stations which enable customers to select, from a library of music tracks, stored in the station's large capacity memory means, the tracks they wish to listen to, prior to deciding whether to make a purchase. These tracks are extracted from a distributable music storage means, such as an upload CD-ROM which also includes index means and a configuration file. Said distributable music storage means are produced in a host computer provided with software that comprises a compression function, encryption function, indexing function, etc. Each listening station comprises: a CD-ROM drive; a hard disk drive; a microprocessor of the form used in personal computer (PC's); decoders comprising digital signal processor chips and a digital-to-analogue converter as well as two headsets for listening.

Among the shortcomings associated with the object of WO 0209112 is the high cost of each music digital station, due to the fact that it includes a CD drive, a hard disk drive and a PC-type microprocessor.

Additionally, the updating of the library of music tracks in each station—detailed in line 8 and following, page 40 of said WO document—is a cumbersome and time-consuming process, requiring the e-mailing of a request from the store operator to the host computer for an album/track listing, the creation of one or more upload CD-ROM's by the host computer operator and their delivery to the store for insertion in each listening station.

Furthermore, as described in line 23 and following, page 41, the deletion of files from a listening post's memory requires the insertion of a "null" CD which has to be inserted in the CD-ROM drive, an action that has to be performed by an operator.

OBJECTS OF THE INVENTION

Accordingly, it is an object of the present invention to provide a music listening arrangement in which the listening stations have a substantially smaller cost that in the known ones.

A further object is to provide a music listening arrangement in which the updating of the library of music tracks can be easily and speedily accomplished.

A further object is to provide a music listening arrangement in which the digitizing station need not be directly connected to the digital music server.

A still further object of the invention is to allow the remote deletion and insertion of music files.

SUMMARY OF THE INVENTION

In proceeding with its studies, the Applicant has now developed improvements to said equipment and process for music digitalization, storage, access, and listening, which improvements are employed in the digital music server, the music digitizing station and listening stations.

So, pursuant to these improvements, when the user desires to listen to some music tracks from a particular CD, said user only have to pass the bar code reader over the bar code tag of said CD, allowing the speedy location of the information comprising artist and title as well as the music files of such CD. Said music file is transmitted through the local network to the listening station, which starts is reproduction in the earphone. Following, using the keyboard and display, the user selects the desired track and controls sound volume.

Likewise, pursuant to these improvements, the selected music file is downloaded in small blocks to the listening station, on demand of the latter, which starts its reproduction as soon as the first block is received. So, the user starts to listen the music at the listening station without having to wait for the whole file downloading. The listening station automatically requests the next song file block, in a manner that reproduction is not interrupted.

Likewise, pursuant to these improvements, the local server is provided with a control software that controls the listening station's entire operation through commands and messages interchanged between said server and the listening stations, said control software embodying a function that allows selected listening stations, on a configurable basis, to reproduce only particular CDs.

Another innovation introduced by these improvements consists in using one remote digital music server.

Besides, another innovation consists in using a "download" software that brings from said remote server the information concerning the CD and its music files, as regards CDs not existing in the local server and that have been requested for listening at the listening stations. This download software allows for automatic updating of the listening stations data files, contrasting to the time-consuming updating routine described in said WO 0209112.

Pursuant to these improvements, the equipment is provided with a maintenance software for the local server, installed in the local server itself, and with a maintenance software for the remote server, installed in the digitizing station.

Formerly, the local server maintenance software was installed in the digitizing station; in the present apparatus said local server maintenance software has been transferred to the local server itself, because in the equipment hereby improved, the local server is a mandatory one, while the digitizing station is optional.

Therefore, the maintenance software installed in the music digitizing station is the "remote server maintenance software", and the maintenance software installed in the local server is the "local server maintenance software".

In fact, both the "local server maintenance software" and the "remote server maintenance software" may be installed in the local server or in the digitizing station; however, it is more logical to install the "local server maintenance software" in the local server, considering that there may exist a system without the digitizing station in the local network (notwithstanding the local server always exists), and the "remote server maintenance software" in the digitizing station, since such station may play the role of the station that carries out the digitizing and accesses the remote server for updating data related to digitized CDs.

The remote server maintenance software installed in the digitizing station has the function of providing maintenance in the table of CDs and music files of the remote server, in a manner similar to that of the local server maintenance software installed in the local server itself.

Likewise, pursuant to the improvements in question, the local server is provided with a software for updating the statistic data (statistic upload software), the function of which is to transmit the listening stations usage statistic information to the remote server.

Also pursuant to these improvements, the digitizing station is further provided with a data updating software (upload software), which enables the remote server to be updated with the information and music files of the digitized CDs and stored in the local server or in the digitizing station itself.

Based on a philosophy of simplicity and low cost, the present invention implements the listening station through an architecture substantially different from those in the existing systems in the market, where, among other important features, we may emphasize the local network interface embodied to the listening station.

Basically, the listening station is formed by dedicated devices comprising a microcontroller, flash memory, components for audio decoding, digital-to-analog conversion, serial and parallel communication and network interface, among others. Consequently, both the cost and physical size of the listening station have been drastically reduced in comparison with the conventional implementation through compatible microcomputers and boards. In addition to that, the listening station becomes practically independent from constant alterations characteristic of the very dynamic and permanent evolution of motherboards, processors and devices compatible with PC microcomputers.

Another advantage provided by the listening station of the present invention is that it allows the installation of a higher and better distributed number of listening stations throughout the store, due to their smaller physical size and an easier installation procedure.

With all of those advantages, this invention enables users to listen to all music tracks from all CDs available at the stores, in a way that is substantially simpler, faster, and cheaper than the solutions normally employed for such a purpose.

BRIEF DESCRIPTION OF THE DRAWINGS

A more complete appreciation of the present invention and many of the attendant advantages thereof will be readily understood by reference to the following detailed description when taken in conjunction with the accompanying drawings, in which.

DETAILED DESCRIPTION OF THE INVENTION

Figure 1:
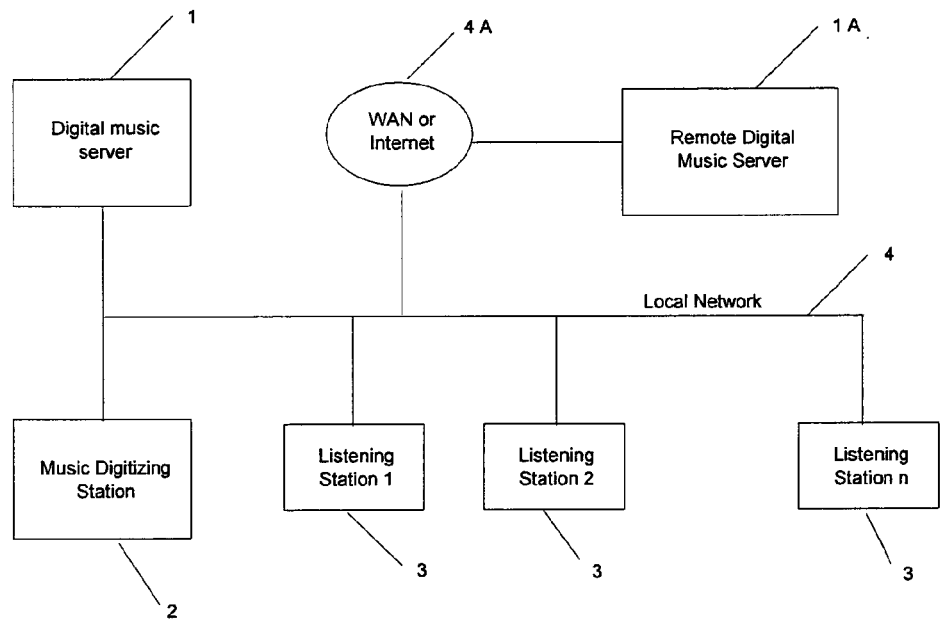
FIG. 1 is a block diagram, schematically illustrating the equipment/process components hereby innovated (for illustration and description purposes only one music server 1 and one music digitizing station 2 are shown, but the system allows more than one music server 1 and more than one music digitizing station 2, as well as it allows that only one microcomputer is the music server and the digitizing station at the same time)

The subject matter of the present patent application relates to an EQUIPMENT AND PROCESS FOR MUSIC DIGITALIZATION, STORAGE, ACCESS AND LISTENING, which constitutes an improvement of the apparatus described in U.S. Pat. No. 6,437,229 of the same Applicant. Pursuant to the schematic illustration of the block diagram of FIG. 1, it comprises a digital local server 1, one music digitizing station 2, and a variable and convenient number of listening stations 3, the latter being interlinked to said local server 1 and to said station 2 by a local network 4, said digital local server 1 being a microcomputer provided with a high capacity hard disk for storing the digitized music tracks, and to centralize, in a database, all the information concerning the digitized CDs.

The digitizing station 2 is a microcomputer provided with a CD-ROM reader and, as an option, with a bar code reader, destined for digitizing a passage (preferably the thirty initial seconds) from each track of an audio CD, converting it in a digital coded file, and recording it in the digital local server 1. Therefore, it is provided with a software that allows music control and digitalization. For each digitized audio CD, a record with the CD information is made in said local server database. Eventually, in situations where the number of CD's to be digitized is very large, options for using more than one digitizing station may be developed.

Pursuant to these improvements, the digital local server 1 is provided with a listening station control software that controls the entire listening stations operation by means of specific commands and messages interchanged between it and the listening stations. So, such a software recognizes and accepts the connection request from each listening station, sends initial configuration commands such as "remove cursor", "clean display", "light display up", "enable input of bar code", sends the message "Read the bar code", receives the bar code, accesses the database for obtaining information concerning the CD the bar code of which has been received, sends a command for adjusting the initial volume and, at the same time, for showing the artist, track number, time elapsed and sound volume on the display, transmits the music file in blocks, in conformity to the requests sent by the listening station, sends the time elapsed in seconds for exhibition in the display, sends, from time to time and alternatively, to be shown in the display, the artist, title, CD number (should there be more than one CD with the same bar code) and the price (if available). From that moment on, the local server software is ready to receive asynchronous messages from the listening station, which may be "end of track", when it shall send the file corresponding to the next track (if it is not the last one), "next track key", when it shall send the command for stopping the current music reproduction (in the case it is reproducing any), and promptly upon send the file corresponding to the next track (which may be the first track, in the case it is already playing the last track of the CD), "previous track key", when it shall send the command for stopping the current track (in the event it is reproducing any), and promptly send the file corresponding to the previous track (which may be the last track if it is already playing CD first track), "stop key", when it shall send the command for stopping reproduction (if it is reproducing any), "volume+ or volume− key", when it shall send a command for adjusting (increase or decrease) the volume and, at the same time, show the value of the new volume on the display, and "read bar code", when it shall operate as previously described.

As another innovation, this local server control software embodies a function that allows certain listening stations 3, in a manner capable of configuration, to reproduce only particular CDs. The purpose of this function is to meet the need of certain stores to promote, together with recorders, certain CDs launches. In such a case, these listening stations 3 do not accept others CDs bar codes.

Moreover, that local server 1 also is provided with a local server maintenance software that allows the exclusion of CDs or music files corresponding to digitized tracks (said exclusion requiring the manual insertion of a "null" CD in the apparatus described in WO 0209112), the updating of data related to the CDs in the database, the listing of digitized CDs, the generation of a summary of the changes made during a determined date period for enabling similar systems in other locations to be updated, the updating of the local system through changes conducted in a system in other location, the listing of statistics of access to CDs by listening stations, so as to be possible to know, for instance, which were the more accessed tracks or CDs within a time period, or to know which were the more used listening stations 3, and to obtain the automatic system updating through an autoexec CD-R containing input and output data from CDs and respective music files.

Also pursuant to these improvements, a remote server 1A is further provided (see FIG. 1 again), which is a microcomputer with a large capacity hard disk destined to store the digitized CDs, and to centralize, in a database, all information about the digitized CDs. Said remote server 1A may be accessed by local servers 1 and by digitizing stations 2, via WAN (wide area network) or via Internet 4A.

Another innovation introduced in the local server 1 is the provision of a download software, which brings from the remote server 1A the information regarding a CD and its music files, for CDs not stored in the local server 1 and that have been requested for listening at the listening stations 3. Said software also enables the search, in said remote server 1A, at a preset time, of all CDs, the bar codes of which are compiled in a list available in the local server 1.

A further innovation introduced in the local server 1, is the provision of a statistic upload software, the function of which is to transmit the statistic data of the listening stations 3 usage, collected and stored in the local server 1, to the remote server 1A. Said software automatically sends the statistic data to the remote server 1A at a preset time, provided that data already sent in previous times shall not be sent any longer and may be deleted from the local server 1. One advantage in having the statistic data in the remote server 1A is that since all data are centralized, it is easier to generate comparative reports involving more than one store.

So, in accordance with these improvements, the remote server concept was included, the purpose of which is to be a repository for all digitized CDs. It is, therefore, a central server that may be accessed by the local servers 1 of the various stores, and also be digitizing stations 2, via WAN (wide area network) or via Internet 4A, in order to bring to the stores the CD files demanded by users, and also enabling the updating of said remote server 1A with the files of CDs digitized in the digitizing stations 2 located in the local network environment of stores.

Moreover, pursuant to these improvements, the digitizing station 2 is also provided with a program for updating the data (upload software), which enables to update with remote server 1A with the information and music files related to CDs digitized and recorded in the local server 1 or in the digitizing station 2 itself. That software allows the immediate updating, as soon as a CD is digitized, or the updating at a preset time. It may also check whether a CD is already present in the remote server 1A, and, such being the case, not carry out the updating, or update regardless such a fact. So, the digitizing station 2 may be also used as a dedicated station, in order to input the new CDs launches into the remote server, and may be placed in a local network different from the local network where the listening stations 3 and the local server are.

The software set of the digitizing station 2 also comprises the remote server maintenance software. Such software has the function of providing maintenance in the table of CDs and music files of the remote server 1A, in a manner similar to the maintenance software resident in the local server 1.

Figure 2:
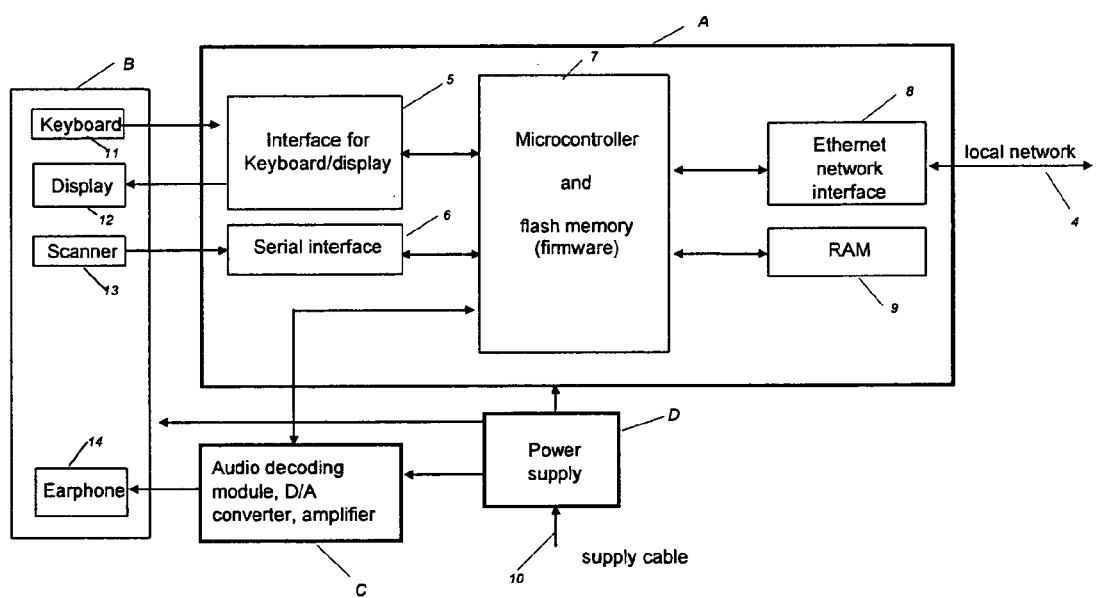
FIG. 2 illustrates the hardware block diagram of the listening station.

Also pursuant to these improvements, and as illustrated in the block diagram shown in FIG. 2, the listening stations 3 are hardware and firmware apparatuses (microcontroller program) consisting of modules, the module A consisting of an interface for keyboard/display 5, where the keyboard and the LCD display are connected, a serial interface 6, where the bar code reader (scanner) is connected, a microcontroller 7, which is the processing unit that executes the instructions of the firmware contained in the internal flash memory, a local network interface 8, where an Ethernet local network 4 is connected, and a RAM 9 used by the firmware as a data area. The module B consists of a keyboard 11, a LCD 12, a bar code reader (scanner) 13, and an earphone 14, and constitutes an independent physical module because it is in direct contact with the user. The module C consists of the audio decoder, digital-to-analog (D/A) converter, and the amplifying circuit for stereo audio output; the earphone 14 of the module B is connected to this module C. And the module D is a power supply that provides the required voltages to modules A, B, and C, and has a power supply cable 10.

Unlike a microcomputer, which requires an operational system and drivers, further to the application per se, this hardware apparatus requires, for it to operate, only a program (firmware) that controls the resources of the hardware, and which communicates with the listening station control software installed in the local server 1. The listening station firmware is responsible for requesting the TCP connection with the local server, receiving asynchronous messages from the bar code reader (CD bar code), from the keyboard ("next track", "previous track", "stop", "volume+" and "volume−"), and from the audio module ("song end"), and to send them to the local server, receive and execute commands sent by the local server, comprising "remove cursor from the display", "clean the display", "light up the display", "enable the keyboard", "show the message on the display", "adjust the volume and show the message on the display", "store music block and start reproduction", "stop music reproduction", etc.

The final user has access only to the bar code reader, the keyboard, the display, and the earphone (Module A). The communication of the hardware apparatus with the bar code reader is made through serial ports RS-232C, RS-485, or USB, and with the keyboard by the keyboard interface. The sound is played in the earphone by module B, which contains the audio decoder, digital-to-analog converter, and output amplifier. The earphone can be of the conventional type usually found in the market, but it must be provided with a steel-coil protection for preventing stealing and vandalism. The bar code reader may be a laser scanner with line scanning, or a CCD technology scanner, and the keyboard may be embodied as an apparatus with simple keys, provided with keys enough to allow the user to control track selection (forward and reward), the sound volume (increase and decrease) and also reproduction interruption. Eventually, the keyboard may have more keys allowing other functions.

Local network bandwidth 4 should preferably be around 100 Mbps, taking into account the distance between the listening stations 3 and the local server 1. In case of very long distances, complementary equipment may be required. The local network can be implemented by cables with conducting and connecting wires linking the involved equipment, or even by an electromagnetic wave communication means.

Figure 3:
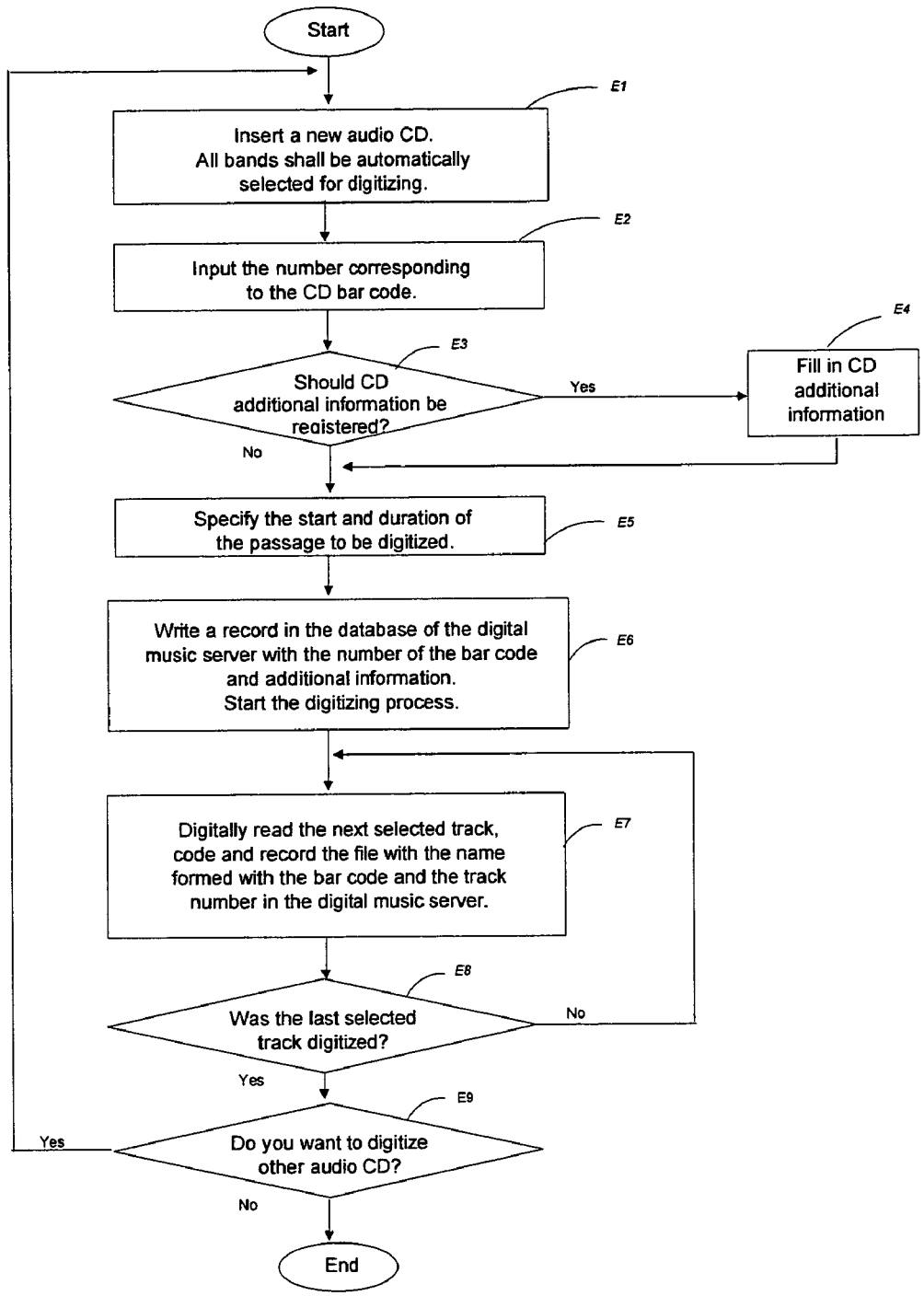
FIG. 3 is a flow chart of the music digitizing station, illustrating the sequence of operations for conducting music digitizing and storage at the music server hard disk.

FIG. 3 is a flow chart of the music digitizing station 2, illustrating the sequence of operations for carrying out music digitizing and storage on local server's hard disk 1, exactly as occurs in the former U.S. Pat. No. 6,437,229, and described herein in order to help the understanding of the equipment and process hereby improved.

Thus, the process starts by inserting an audio CD, in step E1, and all tracks are automatically selected for digitalization. In step E2, a number corresponding to the CD bar code is provided. In step E3, a decision is made as to whether additional information in the CD (artist and title) shall be included. If so, CD additional information is input in the step E4.

Once such information is inputted to the system, or if no additional information is to be inputted, it goes to the next step E5, where the beginning and duration of the music passage to be digitized is specified. In step E6, the CD bar code number and, if any, additional information thereon, is entered into the digital music local server 1, starting the digitizing process for all tracks of the inserted CD.

In step E7, the digital reading of the first selected track is made, coding it in compacted form, recording it promptly in the digital music local server 1, the resulting file bearing the name formed by the bar code number and the track number.

In step E8, a determination is made whether the last selected track has been digitized; if not, it returns to the step E7, reading the next selected track, its coding and recording the file in the digital music local server 1. That step E7 is repeated for every track of the CD, until the last track has been digitized. When the answer for the step E8 is that the last track has been digitized, it goes to step E9, which determines whether the user wishes or not to digitize another CD. If yes, it returns to step E1. If not, the digitizing and storage process for a passage of all audio CD tracks is terminated.

Figure 4:
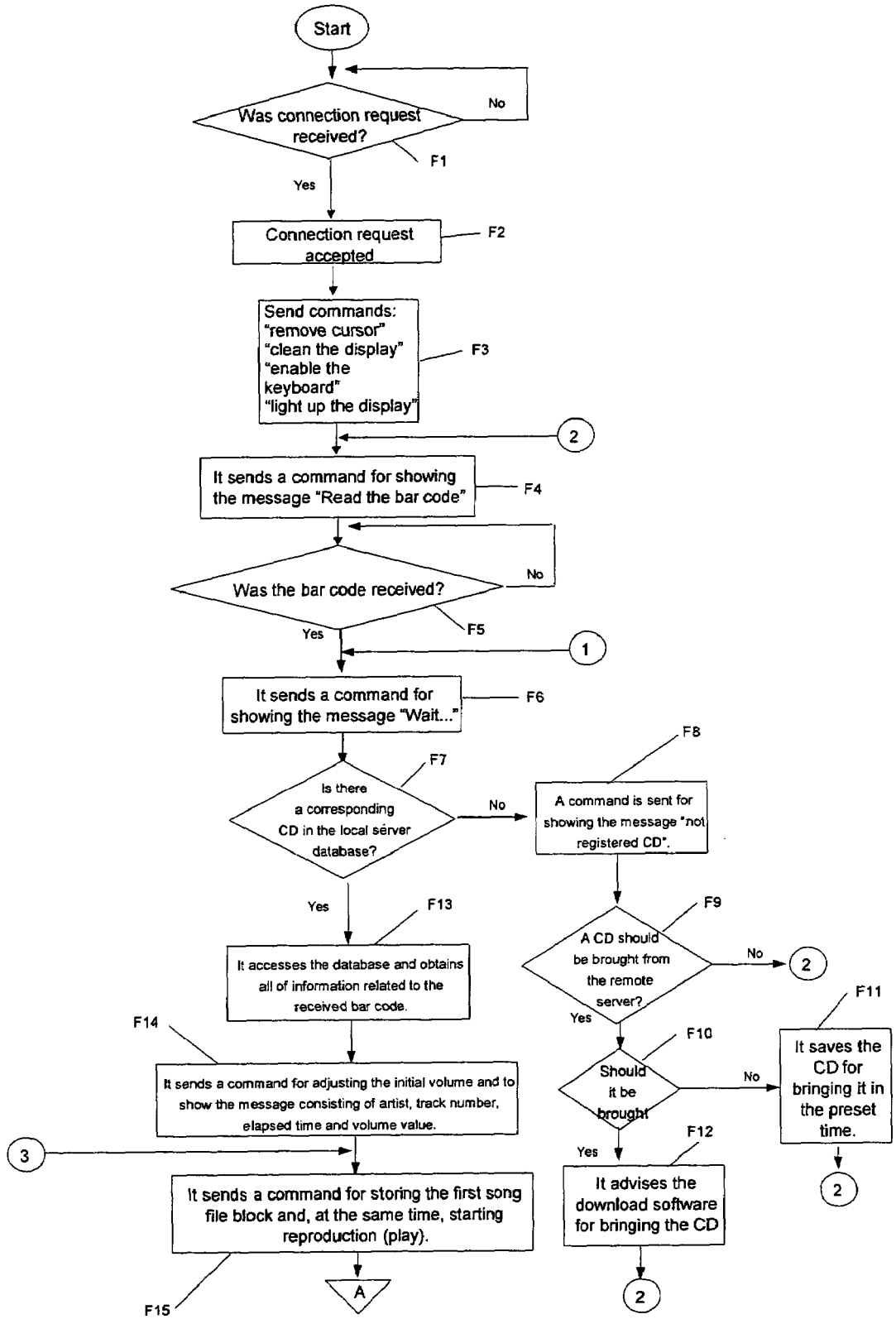
FIGS. 4 and 4A represent, on a continued basis, the music server flow chart.
Figure 4A:
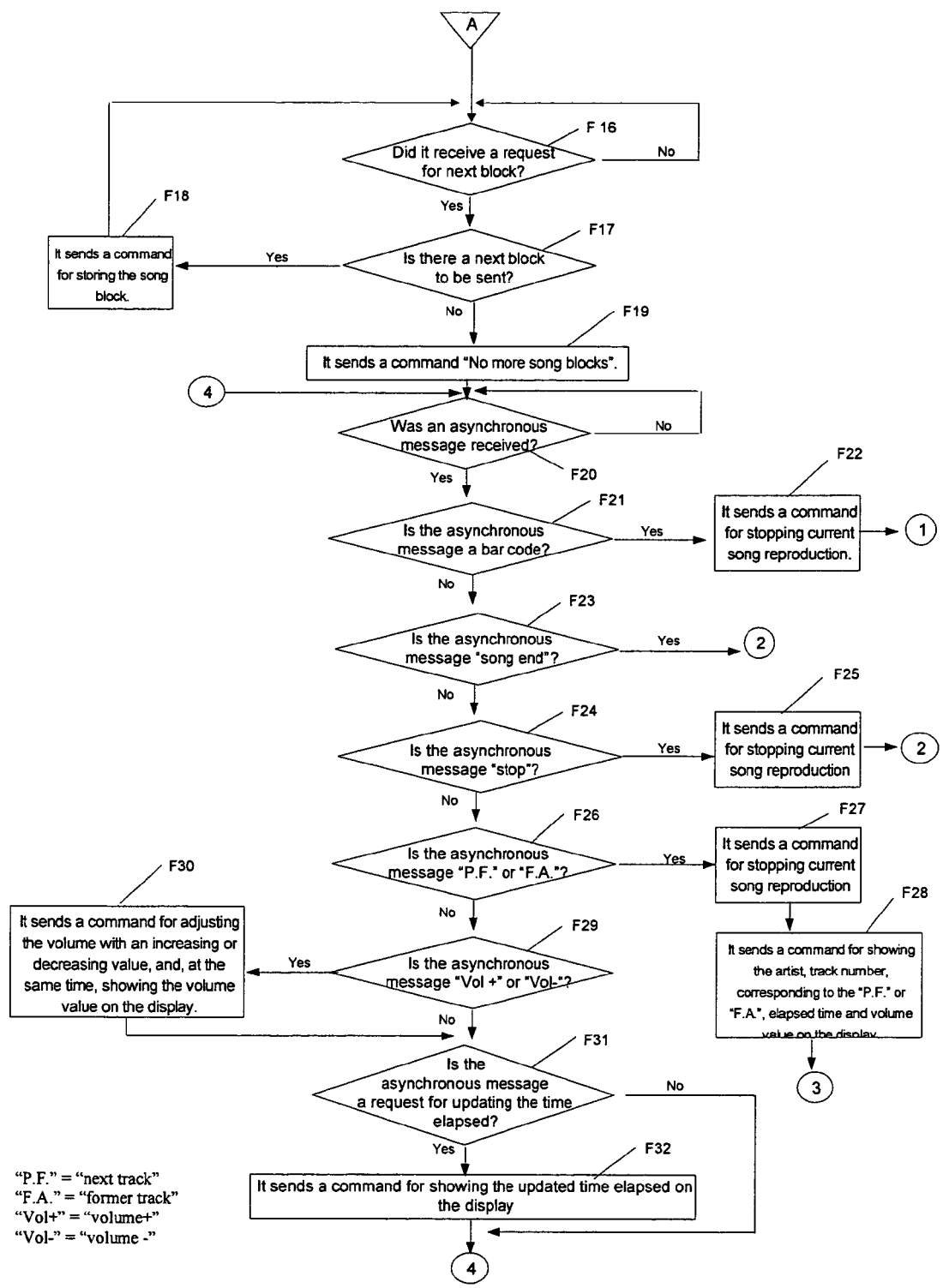

FIGS. 4 and 4A illustrate, one after the other, the flow chart of the listening station control software run by the local server, subject matter of the present improvement, when executing an operation cycle that begins with the TCP connection request up to the activation of keyboard keys, including the sending of the bar code, database access, and transmission of the music file.

In the initial step F1, it waits for the connection request from a listening station. When the request is received, it accepts it (step F2), which makes connection between the local server and the listening station to be established. In step F3, it sends the configuration commands "remove cursor", "clean display", "enable keyboard" and "light up display" to the listening station. Promptly upon, in step F4, it sends the command for showing the message "Read the code bar" on the display enabling the reception of the bar code by the microcontroller. From that point, it waits for a bar code sent by the listening station (step F5). When the bar code is received, it sends the command to show the message "Wait . . . " on the display (step F6).

In step F7, it checks whether the CD, whose bar code was received, exists in the local server. Should such CD not exist in the local server, the message "CD not registered" is sent to the listening station (step F8), and, promptly upon, it checks whether that CD should be searched in the remote server (step F9). If not, the flow returns to step F4, where the message "Read the bar code" is sent. If yes, it checks if the CD should be immediately brought from the remote server (step F10). If the CD should not be immediately brought, the information concerning said CD is saved in a list of CDs to be brought by the download software at a preset time (step F11), and the flow returns to step F4. If the CD is to be immediately brought, it sends a message, together with the required information, to the download software for it to search the CD in the remote server (step F12), after what the flow proceeds to step F4.

If the bar code of the CD exists in the local server, the database is accessed (step F13) and all information associated to the bar code is received. Next, in step F14, it sends the command for adjusting the sound volume and to show, at the same time, the message formed by artist, track number, elapsed reproduction time and volume value on the display. In step F15, it extracts the music file and transmits its first block, together with a command for storing the first block and, at the same time, for starting music reproduction (play). In step F16, it waits for the message requesting the next block sent by the listening station. When such message is received, it checks whether there is a next music block to be sent (step F 17). If so, it sends the block together with a command for storing it (step F18) and returns to step F16. If there is not any other block to be sent, it sends the command "no more music blocks" (stepF19) and proceeds to stepF20, where it waits for some asynchronous message from the listening station.

If an asynchronous message comes, it checks whether this message is the "bar code" (step F21). If it is the bar code, it sends a command for stopping the music reproduction (step F22), and it returns to step F6. If it is not a bar code, it checks whether it is "song end" (step F23). If it is "song end", it returns to step F4. If it is not "song end", it checks whether it is "stop" (step F24). If it is "stop", it sends the command for stopping music reproduction (step F25), and returns to step F4. If it is not "stop", it checks whether it is "next track" or "previous track" (step F26). If it is "next track" or "previous track", it sends a command for stopping music reproduction (step F27), and subsequently, in step F28, it sends a command for showing the artist, the number of the track corresponding to the next track or previous track, the reproduction time elapsed and the volume value on the display, and it returns to the step F15. If it is not "next track" or "previous track", it checks whether it is "volume+" or "volume–" (step F29). If it is "volume+" or "volume–", it sends, in step F30, a command for adjusting the new volume value, increasing (if it is "volume+") or decreasing (if it is "volume–") and, at the same time, to show such value on the display, proceeding the flow in step F31. If it is not "volume+" or "volume–" (step F31), it checks whether the asynchronous message is a request for updating the elapsed reproduction time. If yes, it sends a command for showing the updated elapsed time (said value being appended to the command) on the display (step F32) and it returns to step F20. If not, it directly returns to step F20.

Figure 5:
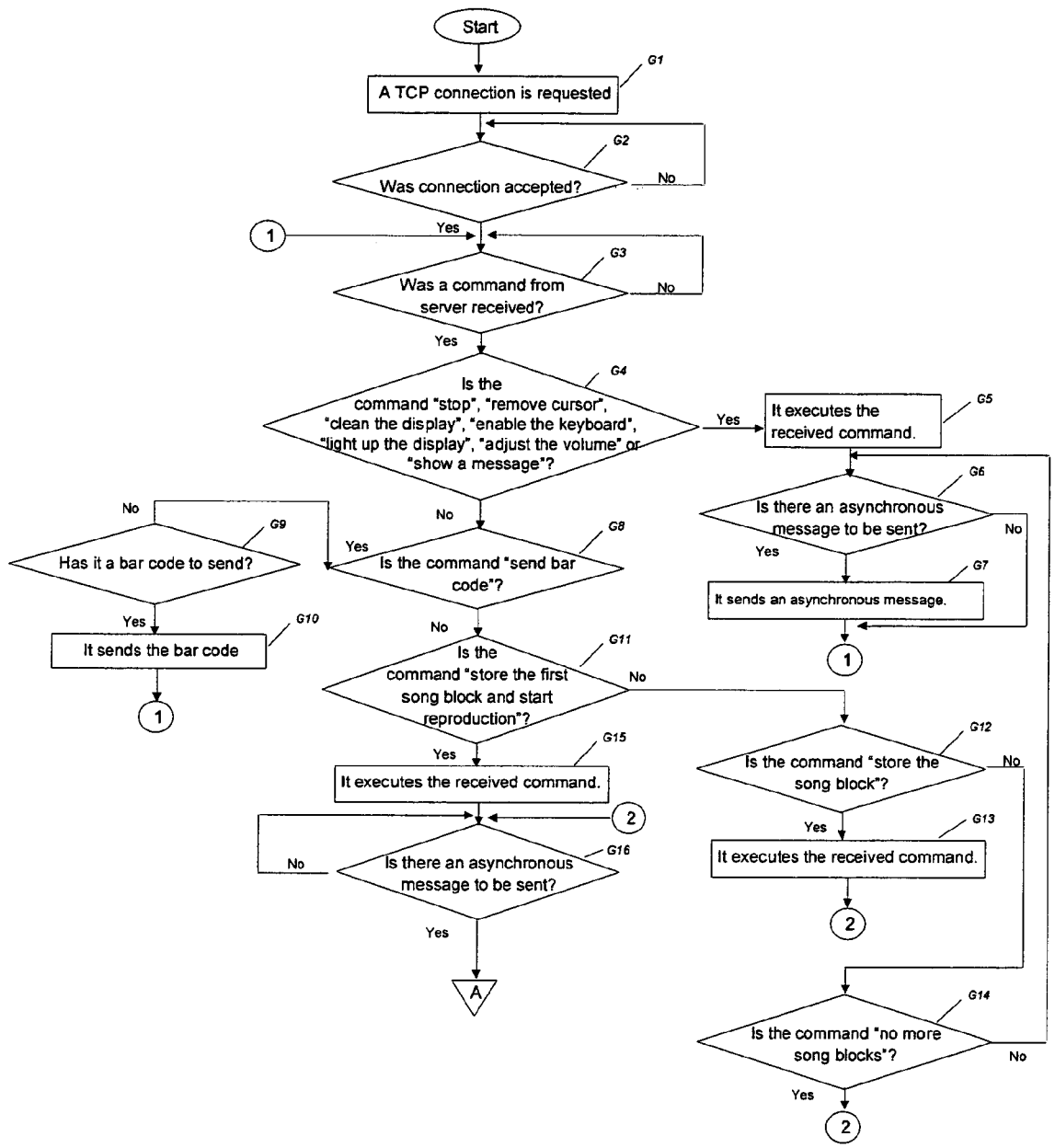
FIGS. 5 and 5A represent, on a continued basis, the listening station flow chart, illustrating the sequence of operations for the user to access and listen the desired music tracks.
Figure 5A:
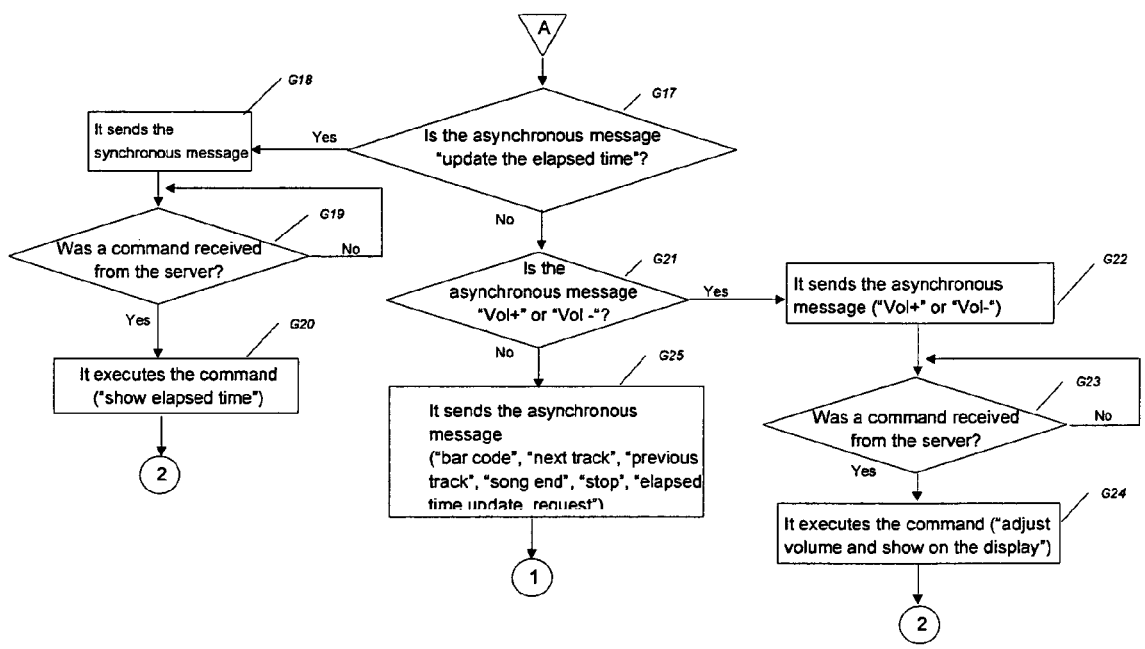

FIGS. 5 and 5A illustrate, one after the other, the flow chart of the listening station program, which is also a subject of this improvement, illustrating the basic sequence of the operations comprised in an operation cycle starting with the TCP connection request, up to the activation of the keyboard keys, including the transmission of the bar code, reception of the music file, and music reproduction.

In the initial step (step G1), a connection request is sent to the local server. If the connection is accepted (step G2), it goes to the next step (step G3), where it waits for a command from the local server. If the command comes, it checks whether it is "stop", "remove cursor", "clean display", "enable keyboard", "light display up", "adjust the volume" or "show message" (step G4). If so, in step G5, it executes the command received; promptly upon, in step G6, it checks whether there is an asynchronous message to be sent to the local server; if yes, it sends that message (step G7) and returns to step G3; if there is no asynchronous message, it returns to step G3.

If the received command is not one of the above, if checks whether it is "send the bar code" (step G8). If it is "send the bar code", it checks, in step G9, whether there is a bar code to be sent. If any, it sends (step G10) and returns to step G3. If not, it waits for a bar code (step G9).

If it is not "send bar code", it checks whether it is "store the first music block and start reproduction" (step G11). If it is not, it checks whether it is "store music block" (step G12); if so, it executes the received command (step G13) and goes to step G16; if it is not "store the music block", it checks whether the command is "no more music blocks" (step G14); if so, it goes to step G16, and if it is not, it returns to step G6. If the received command is "store the first music block and start reproduction", it executes the received command (step G15), and follows to step G16, where it checks whether there is an asynchronous message to be sent to the local server. If there isn't any asynchronous message, it continues in step G16, waiting for some asynchronous message. If there is an asynchronous message, it follows to the next step (step G17), where it checks whether that message is "update the elapsed reproduction time". If so, it sends that message to the local server in step G18, and waits for a command from the local server, in step G19. In that step, if a command comes from the local server, it executes it in the next step (G20), after which it returns to step G16. If the pending asynchronous message is not "update the elapsed reproduction time", it checks whether it is "volume+" or "volume–" (step G21). If so, it sends asynchronous message to the local server (step G22) and waits for a command from the same (step G23). If the command comes from the local server, it executes it (step G24) and returns to step G16. If the asynchronous message is not "volume+" nor "volume–", it sends this message to the local server (step G25) and returns to step G3.

Figure 6:
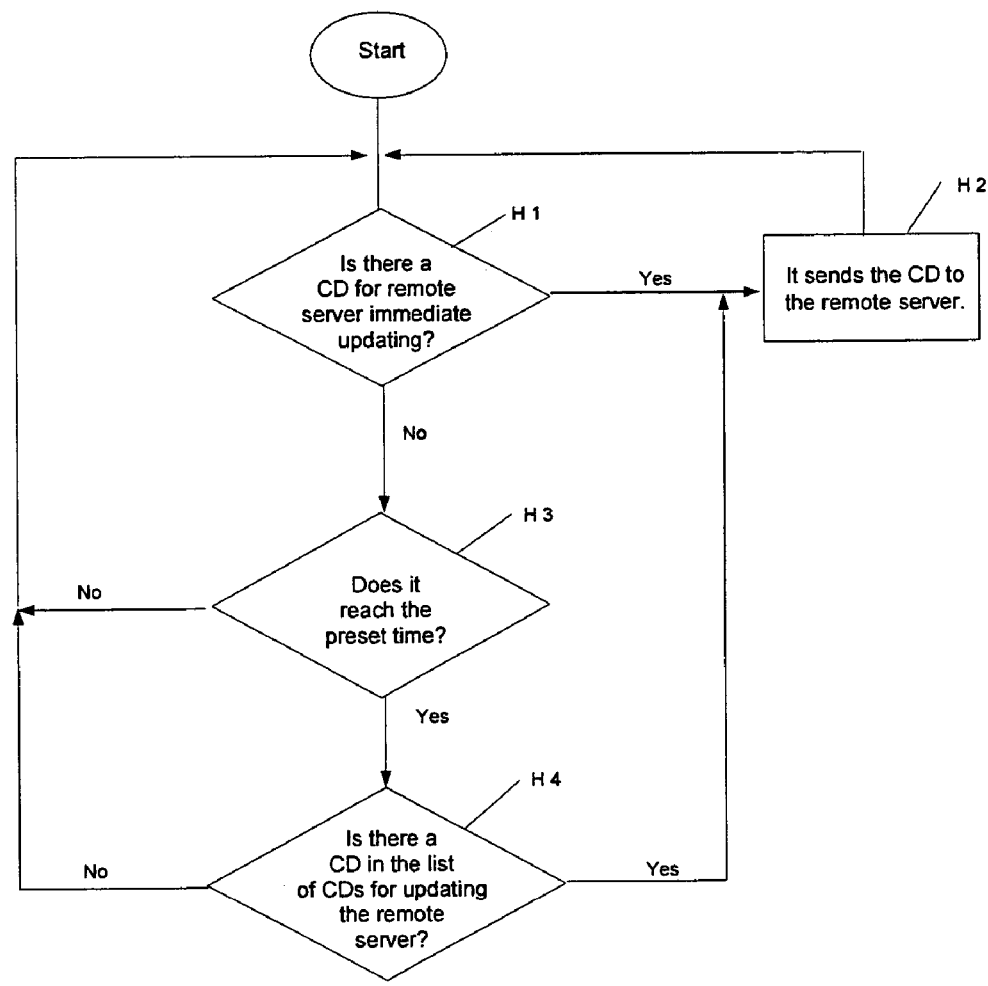
FIG. 6 is a flow chart of the remote server updating software (upload software), illustrating the basic sequence of operations for updating the remote server with CDs digitized and recorded in the local server or, eventually, in the digitizing station itself, in the event it is not in the local network environment of the listening stations and local server.

FIG. 6 is a flow chart of the remote server updating program (upload software), illustrating the basic sequence of operations for updating the remote server 1A with CDs digitized and recorded in the local server 1 or, eventually, in the digitizing station 2 itself, in the event it is not in the local network environment of the listening stations and local server.

In step H1, it checks whether there is any CD digitized in the local server or in the digitizing station that should be sent to the remote server. If any, the information in the CD and its music files are sent to the remote server in step H2, after which it returns to step H1. If not, it verifies, in step H3, whether the preset time was reached. If not, it returns to step H1. If yes, it checks, in step H4, whether there is a CD in the list of CDs to be sent to the remote server at the preset time. If not, it returns to step H1. If yes, it proceeds executing step H2.

Figure 7:
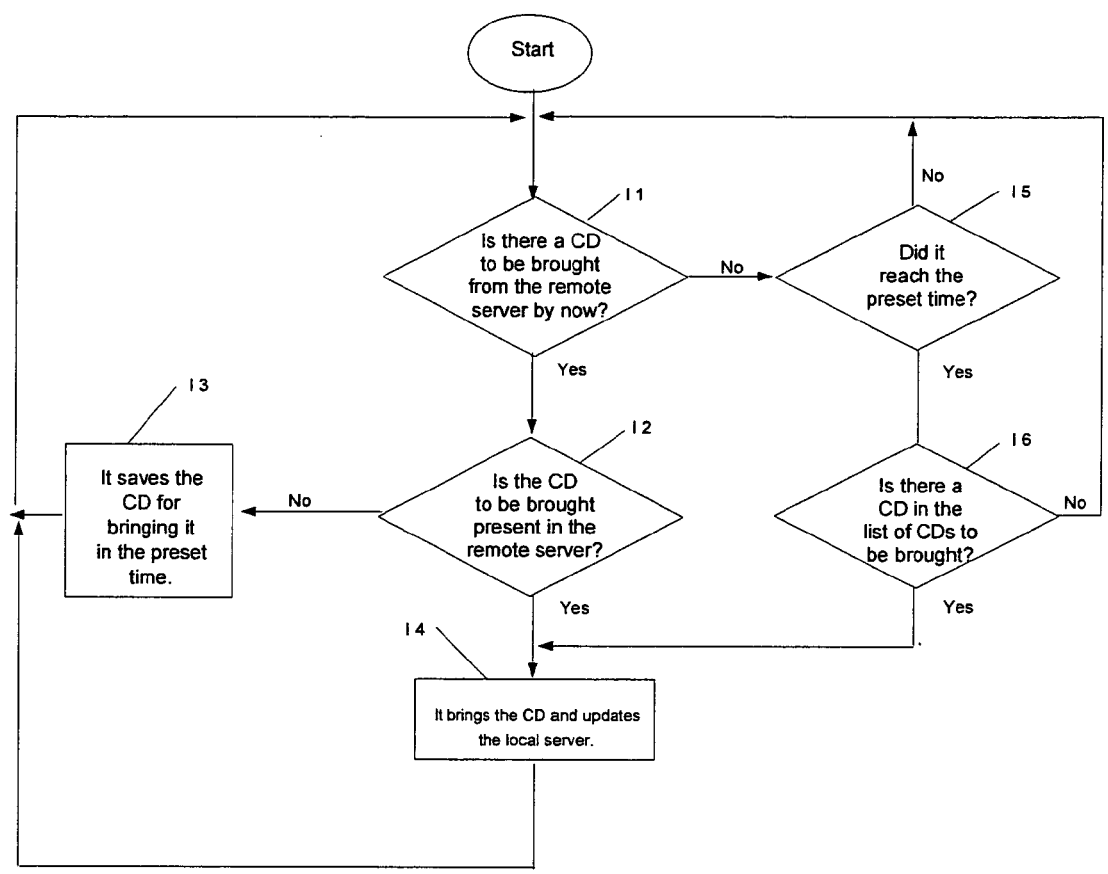
FIG. 7 is a flow chart of the software (download software) that brings, from the remote server, the information concerning any CD and its music files for CDs not stored in the local server, and which have been requested for listening at the listening stations, or which are included in a list of CDs to be brought in a preset time, illustrating the basic sequence of operations.

FIG. 7 is a flow chart of the program (download software) that brings, from the remote server, the information in the CD and its music files for CDs not stored in the local server, and which have been requested for listening at the listening stations, or which are included in a list of CDs to be brought at a preset time, illustrating the basic sequence of operations.

In step I1, it checks whether there is a CD to be immediately brought from the remote server. If yes, it checks, in step I2, if the CD to be brought is stored in the remote server. If it is not stored, in step I3, the data related to the CD in the list of CDs to be brought at a preset time are saved, and it returns to step I1. If it is stored, in step I4 it brings the information related to the CD and its music files from the remote server, and the same are recorded in the local server. Next, it returns to step I1. If, in step I1, there was not a CD to be immediately brought, it follows to step I5, where it checks whether the preset time was reached. If not, it turns to step I1. If yes, it checks, in step I6, whether there is a CD in the list of CDs to be brought from the remote server. If there is not, it returns to step I1. If any, it proceeds executing step I4.

While the invention has been described in its presently preferred form, it is to be understood that there are numerous applications and implementations for the present invention.

The invention claimed is:

1. SYSTEM FOR MUSICE DIGITIZATION, STORAGE, ACCESS AND LISTNING, comprising:

at least one digital local server comprising large capacity storage means for storing a local database containing information related to at least one digitized CD and respective music tracks;

at least one listening station consisting of a plurality of hardware devices comprising a keywboard, a display, a bar-code reader for identifying packaging associated with music CD's, an audio amplifier and a local network interface;

a local network interconnecting said at least one listening station to said at least one local music server, wherein said local server is provided with:
 listening station control software to control an operation of said listening station;
 local server maintenance software;

wherein said at least one listening station further comprises:
 a microcontroller associated with a flash memory provided with a firmware for controlling said plurality of hardware devices, and random access memory for storing digitized music blocks.

2. System, according to claim 1, further comprising a remote server (1A) provided with data processing means and a large capacity storage means for storing a central database containing information related to at least one digitized CD and respective music tracks, said remote server being connected to said local server via a Wide Area Network—WAN—or via Internet (4A).

3. System, according to claim 2, further comprising at least one digitizing station (2) connecting with said remote server (1A) via a Wide Area Network—WAN—or via Internet.

4. System, according to claim 1, further comprising at least one digitizing station (2) connected with said local server (1) via said local network (4).

5. System, according to claim 1, wherein said listening station control software provided in said local server (1) comprises a function limiting the reproduction by at least one selected listening station (3) to previously specified CD's.

6. System, according to claim 1, wherein said local server maintenance software provides at least one of the following functions:
 the deletion of specified digitized tracks or CD's in the local server;
 the updating of data related to CD's in the local server database;
 the listing of contents of said database;
 the generation of summaries reporting the changes made within a determined period of time in similar systems in other locations;
 the updating of the local system through changes originated in similar systems in other locations;
 the compilation of statistical data related to tracks and CD's accessed at each listening station during a determined period of time.

7. System, according to claim 2, wherein said local server is provided with download software that provides the download from said remote server (1A) of at least one digitized CD, comprising its music files and related information, which has been requested at one of the listening stations (3) and which is not stored in the local server (1).

8. System, according to claim 7, wherein said download is performed immediately after said request.

9. System, according to claim 7, wherein said download is performed at a preset time, and comprises all the CD's which have been requested by one or more listening stations (3) in the local system within a period of time and are not stored in the local server (1).

10. System, according to claim 2, wherein said local server is provided with a first statistic upload software that provides the transmission to said remote server (1A) of the statistic data concerning the utilization of said at least one listening station (3), compiled and stored by said local server (1).

11. System, according to claim 3, wherein said digitizing station (2) is provided with a second upload software for updating the remote server (1A) with the information related to at least one digitized CD, and with the respective music tracks, said information and the music tracks being previously stored in the local server (1) or in said digitizing station (2).

12. System, according to claim 11, wherein said second upload software provides the immediate updating of the remote server (1A), as soon as a CD is digitized.

13. System, according to claim 11, wherein said second upload software provides the updating of the remote server (1A) at preset time after a CD is digitized.

14. System, according to claim 12, wherein said second upload software provides said updating after checking that the information related to said digitized CD and the respective music tracks are not stored in said remote server (1A).

15. System, according to claim 12, wherein said second upload software provides said updating regardless of the fact that the information related to said digitized CD and the respective music tracks are stored in said remote server (1A).

16. System, according to claim 2, wherein it comprises remote server maintenance software providing at least one of the following functions:
 the deletion of specified digitized music tracks in the remote server;
 the updating of data related to CD's in the remote server database;
 the listing of the contents of said database;
 the generation of summaries reporting the changes made within a determined time period in similar systems in other locations;
 the compilation of statistical data received from at least one local server.

17. System, according to claim 16, wherein said remote server maintenance software is installed in said digitizing station (2).

18. System, according to claim 16, said remote server maintenance software is installed in said local server (1).

19. System, according claim 3, wherein said at least one digital local server (1) and said at least one digitizing station (2) are the same data processing equipment.

20. System, according to claim 1, wherein said local network (4) connecting the various equipments is implemented by electrical conducting cables.

21. System, according to claim 1, wherein said local network (4) connecting the various equipments is implemented by electromagnetic wave communication means.

22. PROCESS FOR MUSIC ACCESS AND LISTENING, carried out by the system according to claim 1, wherein the listening of a music track at a listening station (3) consists of the sequential bidirectional interchange of information messages between a music listening station and a local server (1) by means of a local communication network (4), the process comprising the following steps:

a) acknowledgment by said local server, of a connection request originating from a listening station and accepting said connection;
b) transmission by said local server to said listening station of initial configuration commands;
c) transmission by said local server to said listening station of a command enabling the input of a bar code in said listening station;
d) transmission of the bar code from said listening station to said local server;
e) searching at the local server database the data files correlated to said bar code;
f) upon detecting said data files in the local server, extracting from the local server database the information associated with said CD and transmitting to said listening station (3) through the local network (4) commands for adjusting the sound volume and showing on the display of the listening station the information associated with the CD;
g) subdividing into blocks the file of the first music track of said CD and transmitting the first block through the local network (4) to said listening station together with a command for starting the song reproduction;
h) upon reception of said first block and said command for starting reproduction at said listening station, decoding and starting the music reproduction;
i) awaiting the message from said listening station requesting the next block;
j) transmission by said local server of the following block of said music file upon reception of said request message;
k) upon reception of said following block at said listening station, decoding and reproducing the music;
l) repetition of steps from (i) to (k) until the end of the file.

23. Process, according to claim 22, wherein in the absence of data files correlated to said bar code in said local server (1), said local server (1) sends a command to said listening station (3) for showing in its display a message informing the absence of a CD.

24. PROCESS FOR DOWNLOADING DIGITIZED MUSIC FILES, carried out by the system according to claim 1, to download digitized music files to a local server (1) from a remote server (1A), said servers being connected by a wide area network—WAN—or the Internet, comprising the following steps:
transmission of a query by said local server concerning the files of at least one digitized music CD;
searching whether said files are stored in the remote server;
upon detecting said data files, extracting from said remote server the files related to said CD and transmitting them to said local server;
reception of said files by the local server and updating the local server database.

25. Process, according to claim 24, wherein said downloading is performed immediately upon confirmation of the existence of said file in the remote server.

26. Process, according to claim 24, wherein said downloading is performed at a preset time.

27. Process, according to claim 24, wherein said downloading comprises the downloading of several CD files, comprised in a list compiled in said local server within a period of time, said list comprising the requested CD's not available in said local server.

28. Process, according to claim 24, wherein it is carried out by the process defined in claim 22 whenever the information related to the data files correlated to the bar code is not found in the local server database.

29. PROCESS FOR MUSIC DIGITALIZATION AND STORAGE, carried out by the system according to claim 1, comprising the steps of:
inserting an audio compact disc (CD) in the CD reader of a digitizing station (2);
providing said additional information to the database which will refer to said CD's digitally encoded files, whenever there is additional information about the CD to be stored;
digitally reading the first track of said CD, encoding it and storing it in a large capacity storage means, the resulting file bearing identification data comprising the CD's bar code number and said track number;
repeating the previous step for all the remaining tracks of said CD.

30. Process, according to claim 29, wherein said additional information comprises the music title, the artist and the sales price of said CD.

31. Process, according to claim 29, wherein said database consists of a database stored in storage means provided in said digitizing station.

32. Process, according to claim 29, wherein said database consists of the local database stored in the storage means of said local server (1).

33. Process, according to claim 29, wherein said database consists of the local database stored in the storage means of a remote server (1A).

34. PROCESS FOR UPLOADING A REMOTE SERVER, carried out by the system according to claim 1, wherein it comprises the following steps:
checking whether there is any CD digitized in the local server (1) or in the digitizing station (2);
checking whether said digitized CD is not already stored in said remote server;
upon detecting said digitized CD in said remote server, proceed with the upload and update said remote server database.

35. Process, according to claim 34, wherein said uploading is performed immediately.

36. Process, according to claim 34, wherein said uploading is performed at a preset time.

* * * * *